C. F. PROPSON.
OPHTHALMIC MOUNTING.
APPLICATION FILED JAN. 6, 1919.
1,330,819. Patented Feb. 17, 1920.
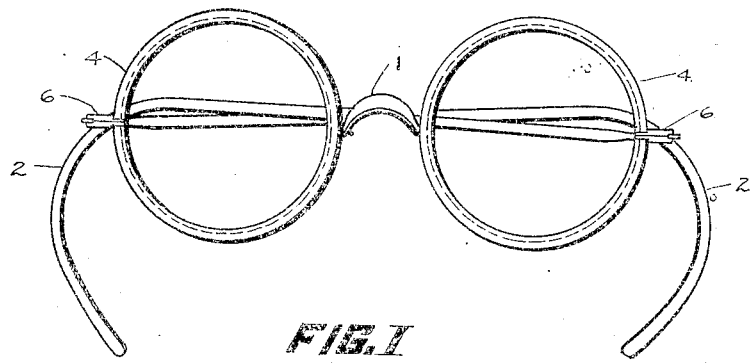
FIG. I
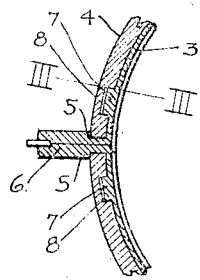 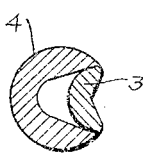
FIG. II    FIG. III
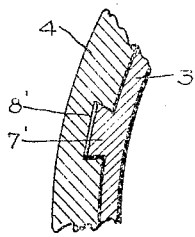 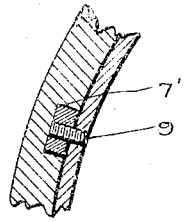
FIG. IV    FIG. V
INVENTOR
CARL F. PROPSON
BY
H. H. Styll   H. K. Parsons
ATTORNEYS

UNITED STATES PATENT OFFICE.

CARL F. PROPSON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,330,819. Specification of Letters Patent. Patented Feb. 17, 1920.

Application filed January 6, 1919. Serial No. 269,818.

*To all whom it may concern:*

Be it known that I, CARL F. PROPSON, a citizen of the United States, residing at Southbridge, in the county of Worcester and State of Massachusetts, have invented certain new and useful Improvements in Ophthalmic Mountings, of which the following is a specification.

This invention relates to new and useful improvements in ophthalmic mountings, and more particularly to spectacle and eyeglass rims, the main object of the present invention being the provision of new and novel means for connecting a metallic and non-metallic rim together around the outer edge of the lenses.

Another object of the present invention is the provision of novel means whereby a non-metallic rim may be quickly and readily placed in position over the outer surface of a metallic lens rim and securely held in position after being placed thereon.

A further object of the present invention is the provision of means for securing a non-metallic rim to a metal rim and at the same time permitting of the ready removal of the non-metallic rim from the metallic rim.

A still further object of the present invention is the provision of a lens rim for eyeglasses or spectacles wherein a split non-metallic rim can be detachably secured over the exterior surface of either a continuous or split metallic lens rim and readily removed therefrom when desired.

With the above and other objects in view, the invention consists in the noval features of construction and the combination and arrangement of parts hereinafter more fully set forth, pointed out in the claims, and illustrated in the accompanying drawings, in which—

Figure I is a front elevation of a pair of spectacles embodying my invention.

Fig. II is a detailed longitudinal sectional view illustrating a manner of connecting the metallic and non-metallic parts.

Fig. III is a detailed sectional view taken on the line III—III of Fig. II.

Fig. IV is a detailed, longitudinal, sectional view illustrating a slightly modified form of the invention.

Fig. V is a detailed, longitudinal, sectional view illustrating another modified form of the invention.

In the manufacture of rimmed spectacles and eyeglasses a special covering has been provided for inclosing the metal rim which retains the lenses in position with respect to the nose bridge, and for this special covering various non-metallic materials have been used, such as zylonite, celluloid, and other similar materials. In a great many cases this outer non-metallic shell is placed in position upon the metal rim in a continuous ring, the same being placed in position upon the metal rim by heating and forcing the same in place. In the present invention I have illustrated a new and novel way of securing a split non-metallic rim to the exterior surface of a metal lens rim, and in the accompanying drawings I have illustrated in Fig. I a pair of spectacles embodying my invention which include the central nose bridge 1 and the usual side temples 2.

The metal lens rims 3 illustrated in the accompanying drawings are connected at opposite ends with the nose bridge 1 and the temples 2, and arranged around the exterior of these metal rims are the non-metallic rims 4, each of said rims in the present instance being illustrated as split rims, each end thereof being fitted within a suitable notch 5 formed within the temple end pieces 6 at a point adjacent the metal rim 3.

Now, in order to securely retain the non-metallic rims 4 in position upon the metal rims 3 and hold them there against movement with respect to the metal rim, I provide suitable lugs 7 which may be either stamped from the metal rims 3 or formed integrally with the same and are adapted to project into suitable recesses 8 formed upon the inner face of the rims 4 at a point adjacent the ends thereof. From this it will be apparent that in placing the rims 4 in position upon the metal rims 3 the ends of the rim 4 are snapped into position in the recesses 5 so that at the same time the lugs 7 will be fitted within the recesses 8, and it will be apparent from the construction illustrated in the accompanying drawings that the coöperation between the fitting of the ends of the rim 4 within the recesses 5 and the lugs 7 within the recesses 8 will prevent any movement of the rim 4 with respect to the rim 3 while at the same time it will be apparent that by the use of force the ends of the rim 4 can be easily removed from their positions within the recesses 5 so as to remove the rim 4 from the rim 3. It will be apparent that in placing the rims 4 over the rims 3 the ends of the rim 4 are forced into position so that they are tightly fitted in place and will not become accidentally removed.

In Fig. IV I have illustrated a slightly modified form of the invention wherein the side walls of the recesses 8' are slightly tapered to correspond with the tapered walls of the lugs 7', and from this form of the invention it will be apparent that the ends of the rim 4 can be fitted into recesses 5 in the temple ends or the recesses eliminated and the ends of the non-metallic rim abutted tightly against the end of the temple 6 as the shape of the lugs 7' forced into the recesses 8' will securely hold the non-metallic rims 4 in position. In the construction of this form of the invention the lugs 7' can be either stamped in the metal of the rims 3 to provide a yieldable catch member so that the same can be readily forced within the recess 8' or they can be integrally formed with the exterior of the metal rim and force applied in order to position the same within the recess.

From the above description taken in connection with the accompanying drawings, it will be readily apparent that I have provided a new and novel manner of securing non-metallic lens frames to the metallic binding frame of the lenses wherein the non-metallic frames can be quickly and readily attached to the exterior of the metal rims and easily removed therefrom. It will also be apparent that in forming the lugs 7 and 7' they may be either stamped from the metal of the rims 3 or integrally formed upon the exterior surface, and furthermore, they may be detachably connected to the rim by having corresponding openings within the metal rim and the lugs and having a set screw arranged therein so that the lugs may be easily detached from the rim or applied thereto when desired, this feature of the invention being clearly illustrated in Fig. V.

In Fig. V I have illustrated another manner of providing for the lugs 7' upon the rims 3 and in this form it will be noticed that the lugs are made separate from the rims and detachably connected thereto by means of the screws 9. It will be understood that this form of fastening can be used with any shape of lug.

I claim:

1. A lens-engaging member including an inner rim, end pieces carried thereby having recesses formed therein, an outer rim engaged over the inner rim and having its ends engaged in said recesses to hold the outer rim in position.

2. An ophthalmic mounting including an inner lens rim, end pieces carried thereby having recesses formed therein, an outer rim fitted over the lens rim and having its ends engaged within said recesses and means to prevent relative movement of the outer rim with respect to the inner rim.

3. An ophthalmic mounting including an inner lens rim, end pieces carried thereby having recesses formed therein, an outer rim fitted over the lens rim and having its ends engaged within said recesses, said outer rim having interior recesses formed therein and lugs carried by the inner rims adapted to engage within said recesses to prevent relative movement of the outer rim with respect to the inner rim.

In testimony whereof I have affixed my signature, in presence of two witnesses.

CARL F. PROPSON.

Witnesses:

H. K. PARSONS,
H. E. COLEMAN.